United States Patent
Kadah et al.

(10) Patent No.: US 8,093,858 B1
(45) Date of Patent: Jan. 10, 2012

(54) AC LINE VOLTAGE CONDITIONER AND CONTROLLER

(75) Inventors: Hassan B Kadah, Hortonville, WI (US); Andrew S. Kadah, Manlius, NY (US)

(73) Assignee: International Controls and Measurements Corp., North Syracuse, NY (US)

( * ) Notice: Subject to any disclaimer, the term of this patent is extended or adjusted under 35 U.S.C. 154(b) by 0 days.

(21) Appl. No.: 13/037,807

(22) Filed: Mar. 1, 2011

(51) Int. Cl.
*H02P 1/42* (2006.01)

(52) U.S. Cl. ............... 318/786; 318/801; 363/132

(58) Field of Classification Search ........... 318/227, 318/229, 430, 471, 757, 765, 786–788, 801, 318/799, 821, 826; 363/34, 37, 39, 41, 49, 363/131, 132, 148; 323/223, 205, 282, 300
See application file for complete search history.

(56) References Cited

U.S. PATENT DOCUMENTS

| | | | |
|---|---|---|---|
| 4,459,528 A | 7/1984 | Nola | |
| 4,651,265 A * | 3/1987 | Stacey et al. | 363/35 |
| 4,706,180 A * | 11/1987 | Wills | 363/132 |
| 5,831,410 A | 11/1998 | Skibinski | |
| 5,883,490 A * | 3/1999 | Moreira | 318/807 |
| 6,420,801 B1 | 7/2002 | Seefeldt | |
| 6,753,670 B2 | 6/2004 | Kadah | |
| 7,061,204 B2 * | 6/2006 | Unno | 318/786 |
| 7,432,691 B2 | 10/2008 | Cutler | |
| 7,663,325 B2 * | 2/2010 | McDonough et al. | 315/291 |
| 2003/0034753 A1 | 2/2003 | Heimbaugh et al. | |
| 2003/0095421 A1 | 5/2003 | Kadatskyy et al. | |
| 2003/0122433 A1 | 7/2003 | Bach | |
| 2006/0022648 A1 | 2/2006 | Ben-Yaakov et al. | |
| 2006/0126240 A1 | 6/2006 | Unger et al. | |

OTHER PUBLICATIONS

Xantrex Technology Inc., Xantrex GT Series Grid Tie Solar Inverters, 2008.
Worden, James et al., How Inverters Work, SolarPro, Apr./May 2009.

* cited by examiner

*Primary Examiner* — Rajnikant Patel
(74) *Attorney, Agent, or Firm* — Bernhard P. Molldrem, Jr.

(57) ABSTRACT

A voltage or power conditioning and control device may be used in line with a source of AC line power and a reactive load such as a single-phase induction motor. The device operates to absorb some of the power reflected by the AC load and generate a synthetic power wave to supplement and correct the applied power in level and phase. The device employs a pair of power capacitors, and a pair of electronic switch devices each with a diode in parallel. Gating or command signals are generated based on the line voltage and timing, e.g., zero crossings. The phase or timing of the command signals is selected for a normal or no-boost mode, a voltage boost mode, or a voltage reduction mode. The capacitors are considered in series with the load, and improve the power factor to the load. A variation of this device may be used in conjunction with a solar array or other local power source.

23 Claims, 9 Drawing Sheets

AC LINE VOLTAGE CONDITIONER AND CONTROLLER

BACKGROUND OF THE INVENTION

The present invention relates to devices that regulate, condition and control AC power that is provided to an AC load, such as an induction motor. The invention is more specifically directed to an AC power conditioning device that can adjust the wave shape and voltage level of AC power applied to an AC load, as well as power factor and frequency, to compensate for deterioration in quality of the AC line power. The power conditioning device of this invention can be used with motors from fractional horsepower to several horsepower or above, and where the torsional load on the motor may vary depending upon external factors, and in situations where the quality of the line power may drop, i.e., from a nominal 117 VAC (in North America) to below 100 VAC. Also, the device may be employed for controlling the power factor for an AC or inductive load that may vary during use, such as a single-phase AC induction motor, which may be used to drive a compressor in a HVAC application or in a refrigerator.

For any AC motor, the available motor torque can depend on the condition or quality of the AC line power. The output torque is proportional to the square of the input voltage. During many peak demand times, the quality of the AC line power can vary enormously, with changes in line voltage and in line frequency. A drop in line voltage from 117 VAC to 100 VAC (a drop of about 14.5%) results in a reduction in torque of about 27%. Typically, the motor designer is forced to over-design the motor in order to satisfy load requirements over an expected range of input conditions. The motor armature, which is basically an inductive load, may have to face an unfavorable power factor, which means that the actual applied voltage, i.e., the real component of the complex AC voltage, may become unacceptably low. Consequently, it is desirable to adjust the RMS value of the line voltage so that the motor will operate optimally, even under adverse line conditions.

It is also the practice for any given application to use a motor that is rated over a given voltage range of ±10%. This means that the system has to be over-designed to meet full load requirements at low voltage. Otherwise, for a given AC induction motor, if the input voltage is 10% low, i.e., V=90% $V_{normal}$, then output torque T drops to T=81% $T_{normal}$. This means that, according to conventional practice, the motor has to be over-designed by at least 19%. Consequently, at normal or high line conditions, over 20% of the electric energy is wasted or reflected back towards the power station.

One approach to motor control has been a variable frequency drive (VFD) employing a pulse-controlled inverter, intended for control over motor speed. In VFD the incoming AC power is rectified to produce constant DC "rail" levels, and then an inverter converts the DC power to an AC drive wave using pulse-width modulation (PWM). This technique modifies the leading and trailing edges of a square wave produced by the inverter by chopping the power on and off at a very high rate so that the average current wave can approximate a sinusoidal wave. These VFDs overcome some of the difficulties of operating induction motors directly on line voltage, and permit a range of speed control. However, the use of PWM can lead to other problems, including winding insulation failure in the motor armature, and high switching losses. Moreover, the PWM VFD devices do not, per se, boost the voltage.

In many cases, what is needed is simply to boost (or to regulate) the effective RMS voltage. This can permit use of a smaller-rated motor than would be recommended where unmodified line power is applied directly to the motor.

An example of a phase detection power factor controller circuit, which addresses some of these issues, is discussed in Nola U.S. Pat. No. 4,459,528. There, an active power factor converter is discussed, which reduces the effective applied power by use of a thyristor (triac) and turning the thyristor on and off at various phase angles so as to change the shape of the applied power wave and optimize the phase angle or power factor. Another power factor controller is discussed in Bach Published Application No. US 2003/0122433. The device described there is an active power factor controller with power factor correction and also with a soft-start feature for applying a gradually increasing voltage to the AC load at turn on. These are accomplished by switching the applied power to regulate the amount of the AC input power that passes to the load. These can reduce effective applied voltage but do not boost the power (i.e., voltage) applied to the load.

Power factor (phase angle) correction is a problem for both consumers of AC power and commercial providers. The common practice is to place one or more capacitors in parallel to the load (in the case of an inductive device such as a motor armature). The size of the capacitor has to be selected to match the motor impedance, which can change with line and load conditions. This means that a number of capacitors have to be placed in parallel and switched in or out of circuit as conditions change. This technique requires high capacity AC devices, which are bulky and pricey.

What is needed where line power can be too low or too high is a simple, reliable power conditioner that is capable of increasing the AC voltage or decreasing the applied AC voltage, as needed, to optimize the operation of the induction motor or other AC load device. It is also desirable to avoid the high switching rates of power switching components, as discussed above, which can result in damage to the motor and can produce significant RF energy.

Earlier efforts in brownout protection (i.e., to protect the AC induction motor from burn out in low line voltage situations) have typically involved simply cutting off power to the motor to prevent damage. While this saves the motor, it can cause severe problems for the system that the motor is designed to drive. For example, in a commercial refrigeration application, a freezer system may be used for storage of a frozen food product, e.g., frozen meat, ice cream, or another food product. During a so-called brownout, when the operating line voltage drops below a safe threshold (e.g., reduced from 120 volts RMS to below 95 volts RMS) then the compressor motor is simply shut off, and no refrigeration takes place. If the brownout lasts for a period of an hour or more, the meat may begin to spoil, or the ice cream may melt. It would be more desirable to continue to operate the refrigeration system during brownouts, i.e., modifying the AC power wave so that it is sufficient to run the equipment, even if at a partial speed. However, that has not been possible with existing power control circuits.

There are regions where commercial power is not particularly reliable, and where the line power can vary significantly up and down during the day. In such areas, the conventional approaches have involved use of a variable transformer to boost the voltage, and/or an extra heavy-duty motor that is over-designed for reliable power but which is able to withstand significant drops in the AC line voltage without failure. These approaches waste a significant amount of power.

OBJECTS AND SUMMARY OF THE INVENTION

It is an object of this invention to provide power to an AC load, such as a motor armature, and to regulate and control the drive waveshape and voltage in a way that avoids the drawbacks of the prior art, as mentioned above.

It is an object of this invention to optimize applied power, through power factor correction, to avoid waste of electrical energy.

It is another object to provide power conditioning device to achieve efficient operation of a compressor motor or other non-linear or reactive load through voltage regulation under conditions where the line voltage quality may vary significantly.

A further object is to provide an AC power conditioning device having features or capabilities for soft start, hard start, voltage regulation of ±30% or better, and power factor correction.

It is another object to provide capabilities for soft-start as well as hard start (torque enhancement) in combination with voltage regulation for optimal motor operations under a variety of conditions.

It is a still further object of this invention to expand the voltage operating range of existing or new equipment above and below the nominal voltage of the AC line.

It is still another object of this invention to provide a circuit of low-component count, low-loss, and low-cost design.

Other objects include source and/or load impedance matching to achieve maximum power transfer; capability for metering of volts, amperes, power, power factor, and watt-hours to achieve economy of operation; facilitation of programmable energy management system; as well as motor control capabilities to correct or adjust for phase loss, phase rotation or phase correction (in a three-phase system); correction of voltage imbalance; under-voltage and over-voltage protection; programmable overload protection; and communication with power provider, e.g. for off-peak pricing differentials.

Further objects include motor speed control through variable voltage and motor speed control through variable frequency (line frequency and applied power frequency need not be the same).

Another object is to provide inverter capabilities for use with a DC power source, including tying to a solar or other power source (to substitute for a so-called grid tie inverter system) and to provide a "green energy system."

Still further objects are arc interruption and ground fault interruption capabilities.

According to one aspect of the invention, power factor can be corrected with the use of a capacitance to increase or reduce the applied motor voltage, without the drastic chopping of the power wave, and without the associated RF radiation that is characteristic of current systems.

Command signals are applied to respective switching components, which may be IGBTs, MOSFETs, power transistors or the like. Other possible switching components may be SCRs, Triacs, or Silicon Bilateral Switches. The command signals may come from logic components (e.g., op-amps, differential amps, etc.) or a microprocessor, and these may be communicated directly or indirectly (e.g., with an opto-isolator) to the associated power switching components. In some components, a gate may not be required.

According to an embodiment of the invention, an in-line voltage regulation circuit device is capable of responding to changes in quality of a single-phase AC input line power that is to be applied, at an adjusted AC voltage level, to a two-terminal single-phase induction motor or other AC load device. The voltage regulation circuit has a provision for connecting to a source of such single-phase AC line power, having a first AC power conductor and a second AC power conductor. A two-input line voltage regulator has first and second AC power terminals, the first AC power terminal being connected to the first AC power conductor and the second AC power terminal being connected to a first AC power terminal of the load, with the second AC terminal of the load being connected to the second AC power conductor. An associated control signal generator can have one or more sensor inputs coupled with the AC power source, and has provisions to detect the AC voltage level of the AC input line power and to detect zero crossings and polarity of the AC line power, and has outputs to provide first and second command signals to the line voltage regulator. These command signals are employed for the timed gating of power switching components. The two-line voltage regulator favorably includes first and second power capacitors, each having a first electrode and a second electrode, with the first electrode of the first power capacitor and the second electrode of the second power capacitor each being connected to the first AC power terminal of the voltage regulator. First and second electronic switching devices each have a first power electrode, a second power electrode, and a gate, with the first power electrode of the first switching device and the second power electrode of the second switching device each being connected to the second AC power terminal of the voltage regulator. The second electrode of the first power capacitor is connected to the second power electrode of the first switching device and the first electrode of the second power capacitor is connected to the first power electrode of the second switching device. The first and second outputs of the control signal generator are coupled to the gates of the first and second electronic switching devices, respectively. This may be a transformer coupling, an optical coupling, or other suitable means of gating the devices. Power diodes are favorably connected in parallel with first and second electronic switching devices. The power diodes can each have an anode connected with the first power electrode of the associated switching device and a cathode connected with the second power electrode of the associated switching device.

The power capacitors are considered to be in series with the load, which most frequently is an inductive load, i.e., a motor winding. That is, one capacitor is in series circuit relation with the load (motor winding) during the positive half cycle and the other capacitor during the negative half cycle. This arrangement tends to correct the phase lag inherent with the motor and improves the circuit power factor. Because the switching devices (e.g., transistors) associated with the regulation circuit control the charging and timed discharging of these capacitors, the amount of power angle correction will vary automatically with changes in load to optimize power factor correction at all times during operation.

The illustrated embodiments are employed in a single phase system, but a multiple of these arrangements can be employed with the respective phases of poly-phase (e.g., three-phase) AC power systems. In the case of a delta configuration, it may be sufficient to have these devices on only two of the three phases.

Depending upon line power condition, the control signal generator is operative to provide the first and second control signals in a normal mode, in which the first and second command signals are alternately ON for phase angles, as an example, of 0 to π (180°) and from π to 2π (360°; or in a voltage boost mode where the first and second control signals are alternately ON commencing with a phase delay between 0 and π/2 (90°) and a phase delay between π and 3π/2 (270°), respectively. In a preferred mode, the command signals would gate the first switch (e.g., Q1) ON for 0 to 90° (0 to π/2) and would be OFF from 90° to 180° (π/2 to π). The second switch (e.g., Q2) would be gated ON from 180° to 270° (it to 3π/2) and OFF from 270° to 360° (3π/2 to 2π). The command signals for the switches Q1 and Q2 could provide multiple ON and OFF signals in each of the repetitive half cycles, rather than just one control pulse per half cycle. The ON and OFF times for the command signals can be tailored for line and load conditions to achieve optimal motor performance. That is, the timing of the leading and trailing edges of the command signals can be controlled, relative to the phase of the input power wave, to create the desired power waveform.

Additionally, the control signal generator is operative to provide the command signals in a voltage reduction mode in which the first and second command signals are ON alternately, commencing with a phase delay between about $\pi/2$ and it and between about $3\pi/2$ and $2\pi$, respectively. This circuit element can have a soft start feature, with the reduced voltage being applied for a short period of time at the very commencement of motor operation.

Furthermore, a boost voltage with a reduced phase angle will allow soft start with increased torque, to compensate for voltage lost due to the retarded phase angle.

In an alternative arrangement, a voltage regulation circuit is capable of responding to changes in quality of a single-phase AC input line power, and is also operative to condition the power to adjust the AC voltage level applied to an AC load device that is or may be fundamentally resistive. The line voltage regulator has first and second AC power terminals. The first AC power terminal is connected to the first AC power conductor of the AC line source, the second AC power terminal is connected to the first AC power terminal of the load, and the second AC terminal of the load is connected to the second AC power conductor. As in the previous embodiment, the control signal generator has sensor inputs coupled to the AC power source, and is operative to detect AC voltage level of the AC input line power, and to detect zero crossings of the AC line power (either voltage or current zero crossings). The control signal generator provides the first and second control signals.

In this embodiment, the voltage regulator has first and second power capacitors, each with a first electrode and a second electrode, with the first electrode of the first power capacitor and the second electrode of the second power capacitor each being connected to the first AC power terminal of the voltage regulator. There are first and second electronic switching devices, each having a first power electrode, a second power electrode, and a gate, with the first power electrode of the first switching device and the second power electrode of the second switching device each being connected to the second AC power terminal of the voltage regulator. There are also third and fourth electronic switching devices, each with a first power electrode, a second power electrode, and a gate, with the first power electrode of the third switching device and the second power electrode of the second switching device each being connected to the second AC power conductor. The second electrode of the first power capacitor is connected to the second power electrodes of the first switching device and the third switching device; and the first electrode of the second power capacitor is connected to the first power electrode of the second switching device and the fourth switching device. The control signal generator is coupled to the gates of the first and fourth electronic switching devices and to the gates to the second and third electronic switching devices, respectively.

First and second diodes may be connected in parallel with the first and said second electronic switching devices, and third and fourth diodes may be connected in parallel with the third and fourth electronic switching devices, respectively.

According to another embodiment, the voltage regulation circuit arrangement of this invention may be used in connecting the AC line current not only with the load but also with a supplementary power source, e.g., a generator or a system of solar panels, to boost and supplement the AC line current. This can be useful in reducing the number of watt hours of AC line power that are actually consumed by the user, thus reducing the customer power bill. In addition, excess power may be placed on the grid or power network, in phase and properly conditioned.

The line conditioner has first and second AC power terminals, the first AC power terminal being connected to the first AC power conductor, the second AC power terminal being connected to the first AC power terminal of the load, and the second AC terminal of the load being connected to the second AC power conductor. There are first and second input DC power inputs connected to DC sources, such as solar panels. The control signal generator has sensor inputs coupled to the AC power source, and is operative to detect AC voltage level and zero crossings of the AC line power, and provides first and second command signals to the line voltage regulator. In this case, the voltage regulator includes first and second power capacitors, each having a first electrode and a second electrode, with the first electrode of the first power capacitor and the second electrode of the second power capacitor each being connected to the first AC power terminal of the voltage regulator. First and second electronic switching devices each have a first power electrode, a second power electrode, and a gate (optional in some implementations), with the first power electrode of the first switching device and the second power electrode of the second switching device each being connected to the second AC power terminal of the voltage conditioner. Third and fourth electronic switching devices each have a first power electrode, a second power electrode, and a gate (optional in some implementations), with the first power electrode of the third switching device and the second power electrode of the second switching device each being connected to the second AC power conductor. The second electrode of the first power capacitor is connected to the second power electrodes of the first switching device and the third switching device; and the first electrode of the second power capacitor is connected to the first power electrode of the second switching device and the fourth switching device.

The first and second DC power inputs each have a first power terminal and a second power terminal. The first power terminal of the first DC power input and the second power terminal of the second DC power input connect with the first AC power terminal. Fifth and sixth electronic switches each have a pair of power terminals and a gate (optional), with the power terminals of the fifth electronic switch connecting to the first power capacitor and to the first DC power source, and the power terminals of the sixth electronic switch connecting to the second power capacitor and the second DC power source. Either of both of the electronic switches could be positioned in various locations in line with the DC power source and the associated power capacitor. Alternatively, galvanic isolation can be employed in a given implementation, where needed.

The voltage or power regulation circuit of this invention can be considered as having the first and second power capacitors having one of their plates or electrodes coupled to one AC power terminal and a second electrode, and the other plate or electrode tied to a positive or negative side of a switched bridge. The switched bridge has first, second, third and fourth electronic switching transistors, with the first and second transistors each having a first power electrode (i.e., anode or cathode, source or drain) connected to the other AC power terminal and a second power electrode, and the third and fourth switching devices (e.g., transistors) each having a first power electrode connected to the second plate or electrode of a respective one of said first and second power capacitors. The second power electrode of the first and third transistors are joined to the first AC load terminal, and the second power electrodes of the second and fourth transistors are joined to the second AC load terminal. The DC power source or sources (i.e., photovoltaic array, wind turbine, etc.) has at least a positive DC output and a negative DC output, and in the illustrated embodiment has a neutral or ground terminal between the positive and negative outputs. The regulation circuit further employs a fifth electronic switching device interposed between the positive DC output and the second electrode of the first power capacitor, and a sixth electronic switching device interposed between said negative DC output and the second electrode of the second power capacitor. The fifth and sixth devices may favorably be implemented as FETs and gated by respective command signals from the control signal generator. However, in some cases, diodes could serve the function of charging the respective power capacitors near the time of the voltage zero crossing of the AC power wave.

The neutral DC terminal may be coupled to the first electrodes of the two power capacitors.

This arrangement serves as a mechanism for superimposing positive half cycles of the AC line power onto the positive DC output level, and superimposing negative half cycles of the AC line power onto said negative DC output level. Thus this arrangement can boost the total voltage and total power of the AC power wave by placing a DC level, at each half cycle, at the base of the power wave. During times when the line quality is low, i.e., low voltage conditions, this in effect brings the power up to the proper voltage before being applied to the load. When there is low demand from the load, excess power being generated on the DC source (i.e., solar array or wind generator), the boosted power wave can actually be fed back upstream on the AC input line. In either case, this allows the arrangement to replace the usual grid tie inverter, so that the same function is accomplished without having to employ a grid tie inverter, which is complex and expensive equipment.

The command signals are provided from the control signal generator to the gates (or equivalent) of the first and fourth electronic switching devices and to the second and third electronic switching devices, respectively; and timing output signals may be coupled to the gates of the fifth and sixth switching devices.

The command signals for the respective power switching components can be provided from any of a variety of sources, i.e., logic gates to microprocessor controls. Many designs are possible for the control signal generator. This may be powered from input line power or from a source other than line power. There may be a user interface to allow user adjustment of the output AC drive current, and there may be a visual display, e.g., of Volts, Amperes, Power Consumed, Watts, Power Factor, and Applied Frequency. The display may also show an indication of power saved running in a power corrected mode versus use of direct line power. Measurements of voltage, power, phase, etc. can be available and reported via any suitable communications protocol, including wirelessly, so that the information may be communicated to a building automation load management system.

The control circuitry of this invention can be of a simple, straightforward design, satisfying requirements of being inherently compact, reliable, and relatively inexpensive, and at the same time avoiding energy waste.

The term "electronic switch" or "electronic switching device" is intended broadly to cover a wide range of devices capable of handling the voltages and current levels that may be encountered, and the term "gate" as used in this description and in the claims is intended to refer to any control electrode or control input (e.g., including a photosensitive input in the case of an optical device). "Diode" can include any unidirectional device, including a full-wave rectifier bridge, or may include MOSFET, IGBT, SCR, Triac, SIDAC, etc.

The voltage/power regulation circuit is an effective power factor correction device if used with a reactive, i.e., inductive load device such as a motor winding. The regulation device places the pair of capacitors in a series relationship with the line and the load, and the effective capacitance, i.e., the amount of phase correction, corresponds to the timing of the command signals that are applied to the associated electronic switching devices. The device of this invention automatically corrects power factor in response to load changes or line voltage changes. In addition, because the two capacitors are arranged in anti-parallel with unidirectional current flow (i.e., one capacitor positive, one negative), less costly and less bulky DC capacitors may be successfully employed.

The above and many other objects, features, and advantages of this invention will become apparent from the ensuing description of a preferred embodiment, which should be read in conjunction with the accompanying Drawing.

DETAILED DESCRIPTION OF A PREFERRED EMBODIMENT

Figure 1A:
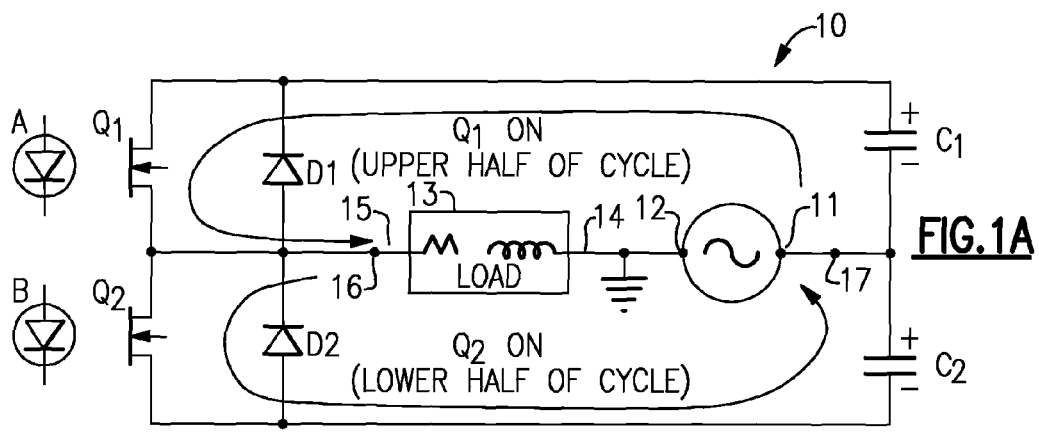
FIG. 1A is a schematic circuit diagram of an AC voltage regulator circuit according to one preferred embodiment, and associated with an inductive AC load, such as the armature of a single-phase induction motor, here shown as employed in a normal or no-boost mode.

With reference to the Drawing, FIG. 1A is a basic schematic view of one embodiment of a motor voltage regulating circuit 10 employing the general concepts of this invention, and adapted to receive commercial single-phase AC line power from a source and then conditioning it and applying it to a load. Here, the voltage regulating circuit 10 has AC power inputs 11 and 12. Power input 11 is considered the "hot" or black-wire input and power input 12 is considered the "neutral" or white wire terminal, and is illustrated here as being at ground potential. These are connected to a source of AC line power, represented here by a wave symbol. This can be a source of nominal 117 VAC in North America or 220 VAC in North America or Europe. An AC load device 13, e.g., a single-phase induction motor has a pair of leads 14 and 15, with one lead 14 connected to the AC power terminal 12. The other lead 15 is connected to a terminal 16 of the regulating circuit 10. The "hot" power input 11 is connected to another power terminal 17. As shown, the power terminal 17 is connected to leads of first and second power capacitors C1 and C2. At the left side of the diagram, there are first and second electronic switching devices Q1 and Q2. These each have one power electrode connected to the terminal 16, and another power electrode connected to the respective outer leads of the capacitors C1 and C2. Each switching device has a diode D1, D2 connected with the anode at one power electrode and the cathode at the other power electrode of the associated switching device Q1, Q2. Each device Q1, Q2 has a gate, which may be a wired gate terminal or, as here, an optical terminal responsive to an optical signal (e.g., infrared) from an associated opto-isolator A, B. The latter devices are illuminated from command signals generated by a control signal generator circuit, to be discussed later, and which can be of any of a wide variety of designs.

Figure 2A:
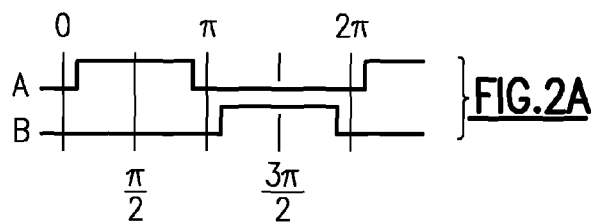
FIGS. 2A, 2B and 2C are waveform diagrams of gating signals or command signals as employed with this embodiment in the normal mode, boost mode, and reduction mode, respectively.

In a normal mode, i.e., when there is no adjustment made to the AC power wave, and the AC line voltage is at or near the nominal line voltage, the control signals a and b can be provided as shown in FIG. 2A. The first command signal a and the second command signal b appear alternately, with the first command signal a being ON for approximately half of a power wave cycle (shown as appearing from phase 0 to phase π—i.e., 0° to 180°) and the second command signal b being ON for the second half of the power wave cycle, i.e, from phase π to phase 2π(i.e., 180° to 360°). There can be a brief period near 0, π, 2π, etc. where both command signals are OFF, to avoid conflicts. The timing may be controlled by sensing the time of zero crossings and polarity of either the voltage wave or the current wave.

Figure 3:
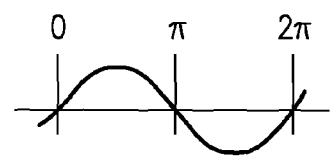
FIG. 3 diagram of an associated waveform of voltage applied to the AC load, for explaining the operation of this invention in the normal mode.

In the normal (no-boost) mode, for the first half cycle, the switch device Q1 is turned ON, and the AC line current flows through the capacitor C1 and switch device Q1 into the motor armature or other load device 13. Then at the second half cycle, the switch device Q1 goes OFF and the switch device Q2 is turned ON. The AC line current then flows from the load device, through the switch device Q2 and the capacitor C2 to the AC terminal 11. In the normal mode, the power wave that is applied to the load is substantially the same as the line power wave, and this is shown in FIG. 3. There is a modest boost provided to the voltage at the load during the run, but a large boost at start-up as explained later.

Figure 1B:
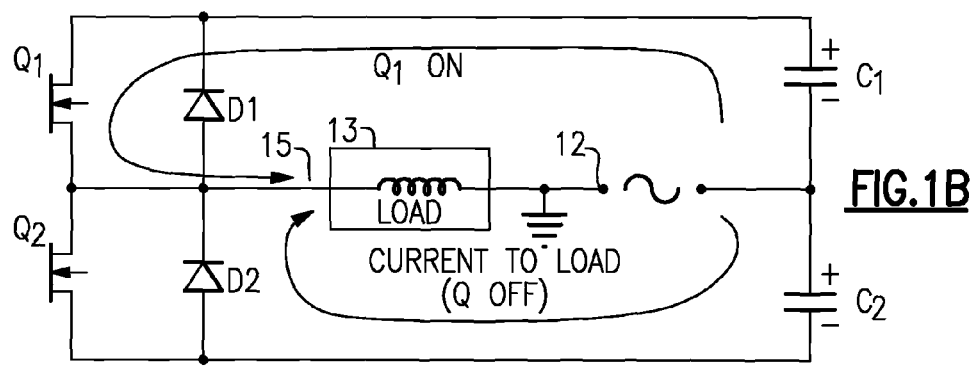
FIGS. 1B and 1C are circuit diagrams of the regulator circuit of this embodiment, here shown as employed in a voltage boost mode.
Figure 2B:
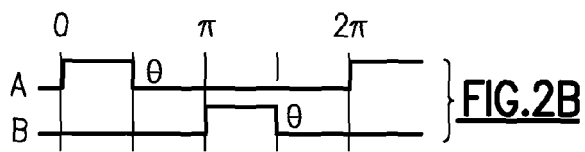

The power boost mode is illustrated with reference to FIGS. 1B and 1C. Associated FIG. 2B shows the wave form of the command signals a and b that are applied for gating the switching devices Q1 and Q2, respectively, at times when the AC line voltage is low, and voltage boost is needed to operate the load device 13 at its design voltage. This mode can also provide a voltage boost at start up, when the load appears mostly resistive due to low back EMF.

In the boost mode, as shown in FIG. 2B, during the positive half cycle, the command signal a is ON and then held OFF for a period to a time or phase θ (here shown as between 90° and 180° or π/2 and π), and the switching device Q1 is thus turned ON for the period indicated, during the positive half cycle the command signal b is OFF. As illustrated in FIG. 1B, during the portion of the positive half cycle from 0 to θ, when device Q1 is held ON, current flows to the load 13 both through the capacitor C1 and device Q1. Then after 0, when command signal a goes low, switching device Q1 ceases to conduct and power flows through capacitor C2 and diode D2 for the remainder of the half cycle, charging capacitor C2 through the load 13. Here the signal a is shown as one pulse per AC half cycle, but there could be multiple ON and OFF switchings, for wave-shaping the output drive waveform.

Figure 1C:
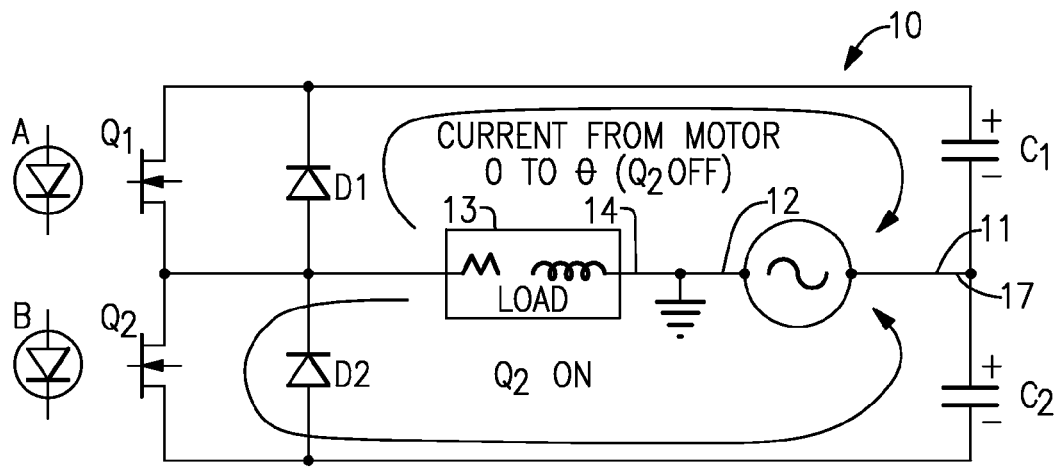

In the next or negative half-cycle, per command signal b in FIG. 2B, and as illustrated in FIG. 1C, for an initial ON period of up until a phase θ from π to π+θ, the switching device Q2 is held ON, and then at the phase θ both the switching devices Q1 and Q2 are OFF, and current flows out of the device 13 and through the diode D1 and capacitor C1 to the terminal 11 (charging capacitor C1 through the load 13).

Figure 4A:
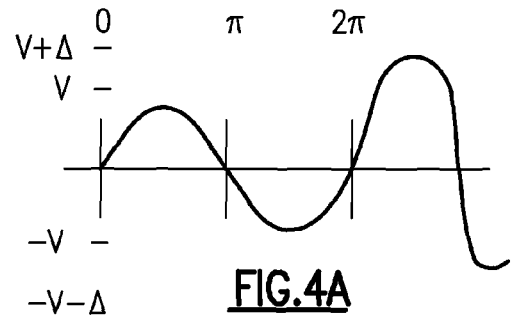
FIGS. 4A and 4B are waveform diagrams of the load voltage applied to the AC load, for explaining the operation of this invention in the voltage boost mode and in the voltage reduction mode, respectively.

The flow of current through the capacitors and diodes during the OFF periods 0 to θ and from π to π+θ serves to pre-charge the capacitor C2 on the positive half-cycle and pre-charge the capacitor C1 during the negative half-cycle. The duration of this period, and the location of the off time θ during the positive or negative half cycle, determines the precharge voltage A that remains on each of these capacitors when the switching device Q1, Q2 conducts on the subsequent half-cycle. This then boosts the applied AC voltage by that amount, i.e., from AC voltage V to AC voltage V+Δ. This feature allows the capacitors C1 and C2 to charge up to higher level of Δ during times of high mechanical load (corresponding to a large amount of rotor slip). If the rotor slip is high, i.e., at start up, the low-impedance load 13 appears mostly resistive, i.e., there is very low reverse EMF. This allows the capacitor C2 to charge up quickly during the positive half cycle and allows the other capacitor C1 to charge up quickly during the subsequent, negative half cycle. Then, when the command signal a is high and the upper switching device Q1 is ON, the current takes the upper path through C1 and Q1, leaving the capacitor C2 charged. For the next half-cycle. On the subsequent half-cycle the motor current takes the lower path through capacitor C2 and switching device Q2. This boosts the applied voltage for the negative half cycle, as shown in FIG. 4A. Then on the subsequent positive half cycle, the capacitor C1 will have been pre-charged, and the applied AC voltage will go to the boosted applied voltage V+Δ. The timing of the signals a and b can be varied to achieve a target AC applied voltage, depending on conditions, e.g., quality of the line voltage. The voltage/power boost in this configuration is dependent upon the inductive or reactive load contribution. The power capacitors C1 and C2 charge through the load 13. If the rotor is slow, slip is high, impedance is low, and back-emf is low, the capacitors charge more quickly, and this produces a greater voltage boost. If the rotor is fast, slip is low, and impedance is high, and back EMF is high. Then the capacitors C1 and C2 charge only to a lower value of Δ, i.e. charge more slowly and provide less boost.

Figure 1D:
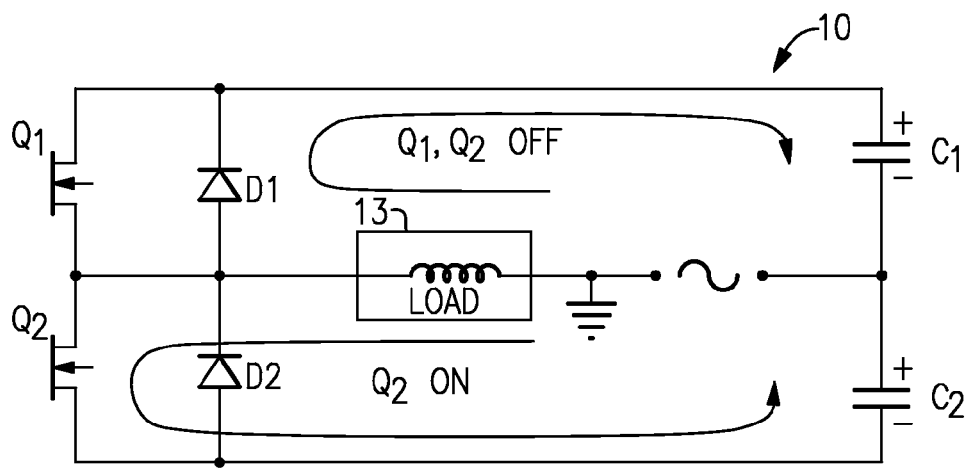
FIG. 1D is a circuit diagram of the regulator circuit of this embodiment, here shown as employed in a voltage reduction mode.
Figure 2C:
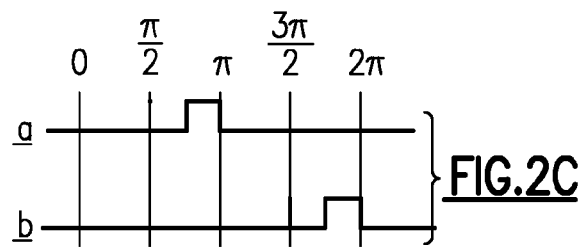
Figure 4B:
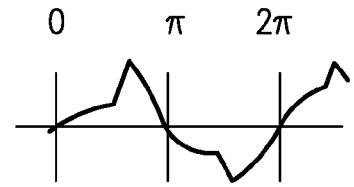

A power reduction mode can be achieved with this same voltage and power regulating circuit 10 as explained with reference to FIG. 1D with reference to the command signal wave chart of FIG. 2C and the applied voltage wave form as shown in FIG. 4B. As shown in FIG. 2C, the command signals a and b are made to appear after a phase angle between 90° and 180° subsequent to the associated zero crossing (i.e., between $\pi/2$ and $\pi$ and between $3\pi/2$ and $2\pi$, respectively). The command signals a and b turn the switching devices Q1 and Q2 on for an end portion of the latter part of the respective half-cycle. During the time the command signals are off, the respective capacitors C1 and C2 partly charge up to a voltage well below peak voltage. Then when the associated switching device Q1 or Q2 is switched on to conduct, the voltage rises from the pre-charge voltage to the line voltage, i.e., as shown in the chart of FIG. 4B. It should be appreciated that this effects a reduced RMS applied voltage and thus a lower power level. The reduction mode may be employed, for example, at motor start up to effect a soft start, to limit mechanical shocks and to limit power surge. Also, as compared with a pure switch mode power reduction (in which a thyristor or similar switching device merely cuts the power in at some phase angle after the zero crossing), the leading edge of the power wave creates a much smaller dV/dt at the inductive load, as the applied voltage rises from a pre-charge voltage, rather than rising from a zero level. The control circuitry which is adapted to call for a reduction mode and to generate the command signals a and b for the reduction mode, and which may vary their phase and width over a start-up period, can be in the form of a microprocessor circuit, and its design would be within the ability of persons working in this field.

Figure 5A:
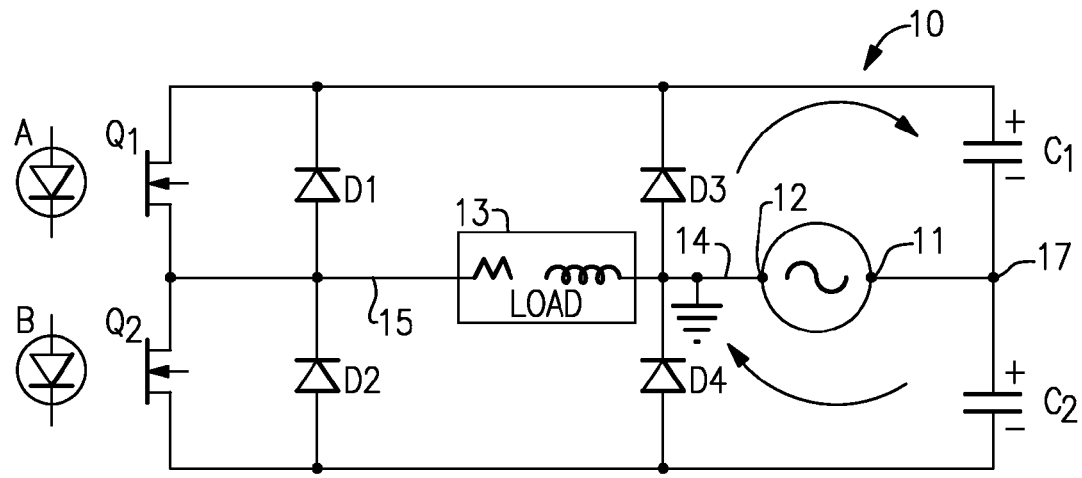
FIGS. 5A, 5B, and 5C are schematic circuit diagrams of an AC voltage regulator circuit according to a alternative embodiments.

A first modification of the voltage and power regulating circuit is shown in FIG. 5A, in which elements that are similar to those in the first embodiment are identified with the same reference characters. In this embodiment, the power capacitors C1, C2 and electronic switching elements Q1, Q2 are provided, as previously, as are diodes D1 and D2 which are connected in parallel with the power electrodes of the switching elements Q1 an Q2, respectively. This embodiment adds two additional diodes D3 and D4 arranged with the anode of diode D3 and the cathode of diode D4 connected together to the neutral terminal 12, the cathode of diode D3 coupled to the upper terminal of capacitor C1 and the anode of diode D4 coupled to the lower terminal of the capacitor C2. This arrangement effects a super-boost mode. On the positive half cycle of each input power wave, the capacitor C2 charges through the diode D4 as well as charging through the diode D2 and the load; on the negative half-cycle, the capacitor C1 charges through the diode D3 as well as charging through the diode D1 and the load. In each case, the paths through diode D3 and through diode D4 dominate, as they are the low-impedance pathways. These permit the capacitors C1 and C2 to be charged to peak at the opposite half-cycles.

Figure 5B:
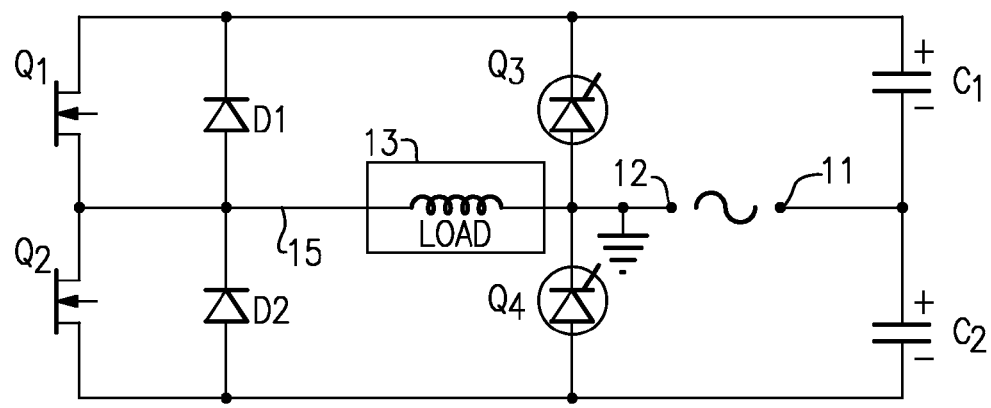

A related modified embodiment is shown in FIG. 5B wherein the elements that are the same as those in the first embodiment are identified with the same reference characters, and a general description of those can be omitted here. In place of the two additional diodes D3 and D4 of the embodiment just described, this arrangement employs thyristors, i.e., SCRs Q3 and Q4 which are respectively connected between the upper plate of capacitor C1 and the neutral terminal 12, and between the terminal 12 and the lower plate of the capacitor C2. In this case, the capacitors C1, C2 can be charged less than the peak voltage on the reverse half cycles. By firing of the thyristor Q3 from $3\pi/2$ to $2\pi$, and by firing of the thyristor Q4 from $\pi/2$ to $\pi$, The amount of pre-charge can be controlled, amount of voltage boost can be regulated.

Figure 5C:
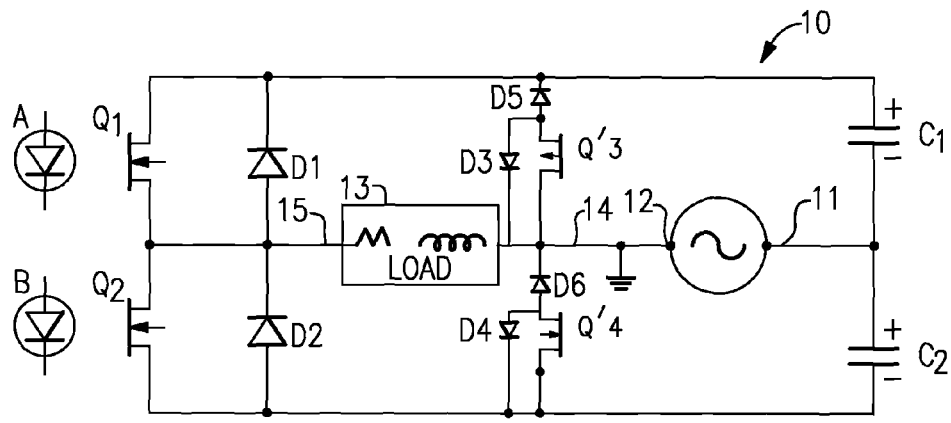

A further embodiment is illustrated in FIG. 5C, where elements that are the same or similar to those in the earlier embodiment(s) are identified with the same reference numbers. In this case, FETs or similar types of transistors Q3' and Q4' are employed in place of the thyristors (SCRs) Q3, Q4. If controlled charging of the capacitors C1 and C2 is desired, multiple charge pulses can be realized by applying a pulsed command signal c or d to the gates of the transistors Q3' and Q4'. In each case, the respective transistors have a series diode D5, D6, whereas the optional protective diodes D3 and D4 are connected across the power electrodes of the respective transistor. This arrangement will operate with capacitive, resistive or inductive loads. The applied load voltage can be regulated, i.e., increased or diminished, by controlling the amount of pre-charge to the capacitors C1 and C2.

Figure 6:
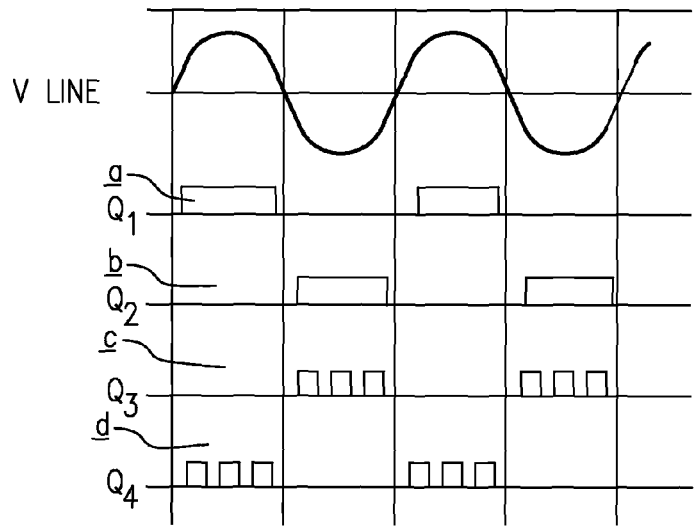
FIG. 6 is a chart showing the waveforms of the input voltage and the gating or command signals employed with the embodiments of FIGS. 5B and/or 5C.

The command signals a, b, c, and d applied to the gates of the transistors Q1, Q2, Q3', and Q4' can appear as shown in the chart of FIG. 6, where the line voltage wave $V_{Line}$ is also shown for reference purposes. The command signals a and b appear as single-pulse (or multiple-pulse) signals on alternate half cycles, as described in reference to previous embodiments. The command signals c and d appear as single or as chopped or multiple pulses during alternate half cycles. The relative duty cycle can be adjusted to achieve the desired precharge of the capacitors C1 and C2.

Figure 7:
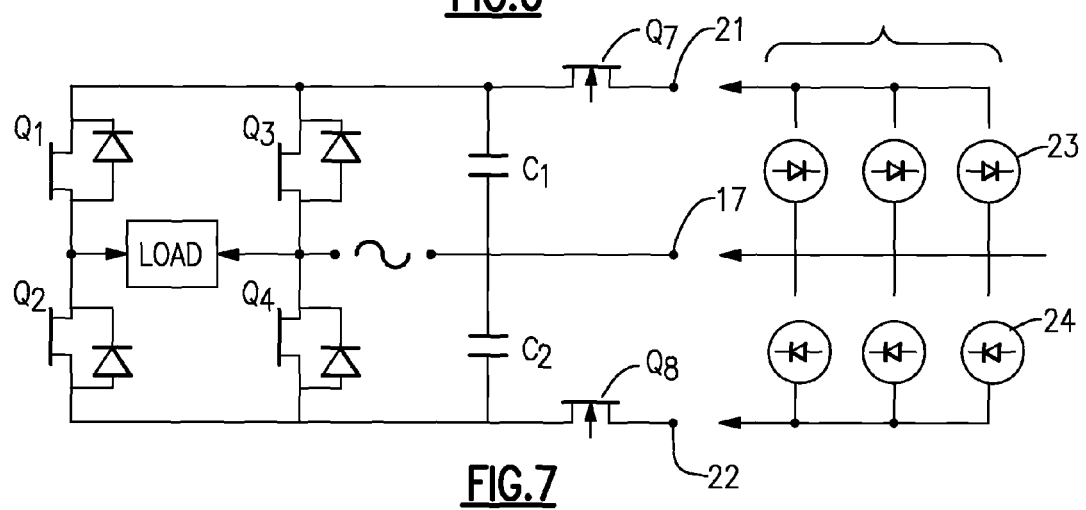
FIG. 7 a schematic circuit diagram of an AC voltage regulator circuit according to a further preferred embodiment, showing both an AC load and a source of DC energy, such as a battery or arrays of solar cells.

FIG. 7 shows an embodiment of the power regulation circuit of this invention, constructed generally as in FIG. 5, but here arranged to control application of an auxiliary power source across an AC load 13, and which is also capable of switching excess amounts the auxiliary power onto the source of line current. In this embodiment, there are two sources of DC power, namely, photoelectric solar arrays 23 and 24 with the positive terminal of array 23 applied to a high terminal 21, a negative terminal of the other array 24 applied to a low terminal 22, and the positive terminal of the array 24 connected with the negative terminal of the array 23 at an intermediate voltage, and this is coupled to the hot or black terminal 17 which feeds the center junction of the two capacitors C1 and C2. Additional electronic switch elements Q7 and Q8 are interposed between the terminals 21, 22 and the outer plates of the respective capacitors C1 and C2. Here, the switch elements Q7 and Q8 are gated ON at or near the zero crossings of the main input AC power wave during opposite half-cycles, and the voltage from the solar arrays 23, 24 is used to pre-charge the capacitors C1 and C2. The energy from the solar array, together with the AC line power, is then gated to the load 13 through the switch devices Q1, Q2, Q3', Q4'. In an alternative arrangement, one or both of the switch elements Q7 and Q8 could be interposed between the respective solar arrays 23, 24 and the terminal 17. Also, this circuit could be easily modified by persons skilled in this field to impose the power generated locally (by the solar arrays) onto single-phase or three-phase power. This arrangement can be employed with other power source devices as well that extract energy from the natural environment (wind, water, solar, etc.) including wind turbines, water turbines, and geothermal-power generators) of which the solar array would be an example.

Figure 8A:
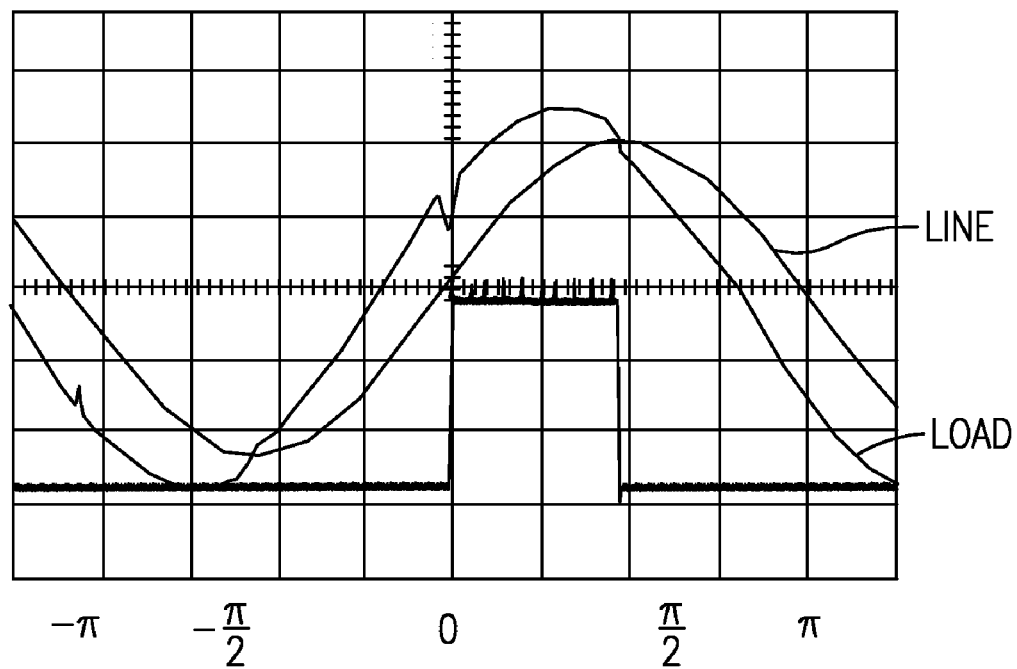
FIGS. 8A and 8B are voltage waveform graphs of the AC line voltage, command signal, and the load voltage applied to the AC load, in respect to the embodiment of FIGS. 1B and 1C.

FIG. 8A is an oscilloscope trace of the applied load voltage where the drive wave is developed in accordance with this invention and is applied to the field winding of an AC induction motor, in a boost mode as discussed in connection with FIGS. 1B and 1C. This trace is typical of each cycle after the start-up, where the capacitors C1 and C2 have been pre-charged on the opposite half-cycle. FIG. 8A shows both the AC line power wave LINE and the load or applied waveform LOAD. For reference, a trace of the command signal a is shown also, which has an ON period of phase angle (0 to $\pi/2$ or 0 to 90°) during each positive half cycle, followed by an OFF period $\theta$ for the remainder of the half cycle. The command signal a remains OFF during the opposite, negative half cycle. The other command signal b (not shown here) has a similar form, but delayed by 180° (or $\pi$). The resultant applied AC power wave LOAD as shown here has a generally sinusoidal waveform. In the example of FIG. 8A, the line voltage has an RMS value of 155 volts, and the applied voltage LOAD has an RMS value of 180 volts. This represents a voltage boost of 25 volts AC. A possible implementation of this could be a lightly loaded AC motor.

Figure 8B:
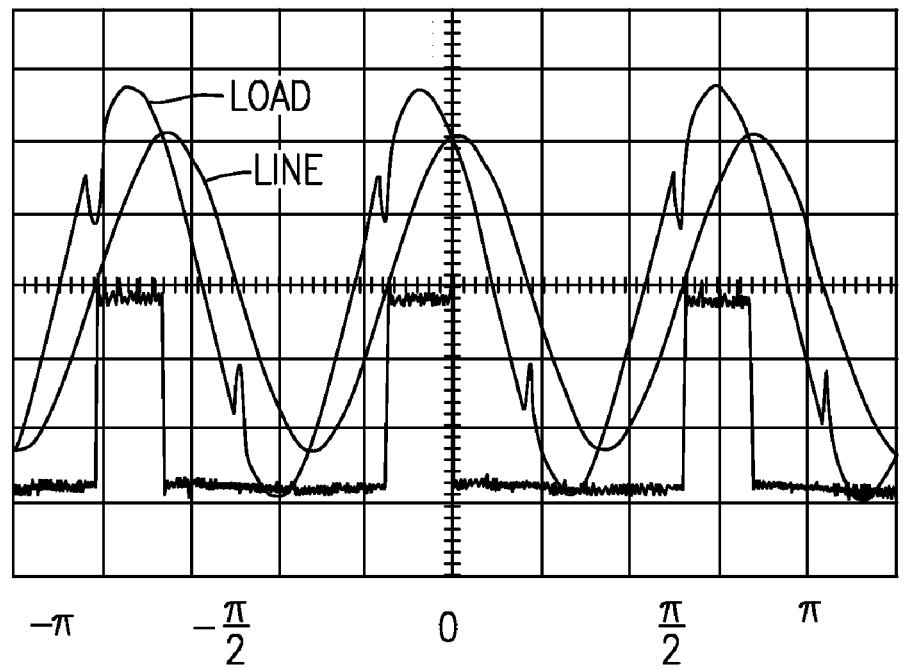

FIG. 8B shows a similar chart of a line voltage LINE and load voltage LOAD with the command signals a (shown) and b (not shown) adjusted for increased output voltage. Here, the line voltage waveform has an RMS value of 154 volts AC, and the output or applied waveform LOAD has a boosted RMS value of 191 volts AC, i.e., a boost of 37 volts AC, e.g., for a heavily loaded AC motor.

In each case, i.e., FIG. 8A and FIG. 8B, at least some of the power reflected by the reactive load is captured by the capacitors C1 and C2, creating a support level by the pre-charging of the capacitors C1 and C2, and this is controlled by the command signals a and b. This captured energy is then applied on the subsequent half cycle. The command signals are generated in response to feedback from the motor (or other reactive load) to optimize motor performance under the existing line and load conditions. The waveform, i.e., the duty cycle and phase of the command signals a and b can be varied to achieve a desired boost in voltage, within a fairly broad useful range. Also, it may be noted that the applied wave LOAD leads the input wave LINE in phase by a few degrees.

With this invention, by sizing the capacitors C1, C2 to the load and controlling the phase and duty cycle of the command signals a and b, between no-load and full-load conditions, a nearly perfect sine wave can be delivered to the load. Where the command signal is held constant, and the load varies, this results in a greater boost for the heavier load. The simple architecture of this system, i.e., with only two reactive elements C1 and C2 in series with the load, and a simple control system to effect the switching, the circuit of this invention can dynamically control the motor voltage and power in response to variable load conditions and to variable line conditions. For the control of motors over a larger power range, e.g., up to five kilowatts, the reactive elements should be sized according to the largest expected load, and then for smaller loads the number, phase, and duty cycles of the command pulses would be selected to produce the sinusoidal load power wave. Of course, in some applications, a non-sinusoidal power wave may be more appropriate, e.g., for a non-linear load in which half-cycle torque requirements are variable (such as a reciprocating compressor). In such a case, a more elaborate control scheme may be required in order to tailor the applied power wave to the load requirements and at the same time to enhance both local and grid efficiency.

Also, because of the inductive nature of the load device when the load is a motor armature, the voltage level of the applied voltage LOAD will self-adjust if the imposed mechanical load changes. That is, if the mechanical load increases upon the rotor of the AC induction motor, the electrical load begins to appear more resistive and less reactive, that is, the load phase angle increases and the back EMF drops. This causes more current to flow through the load and capacitors during the OFF phase $\theta$, and as a result the capacitors C1 and C2 will pre-charge more during the OFF phase $\theta$, increasing the applied voltage LOAD accordingly. When the motor again achieves normal run speed, the applied voltage LOAD will be reduced by a similar amount.

Figure 9:
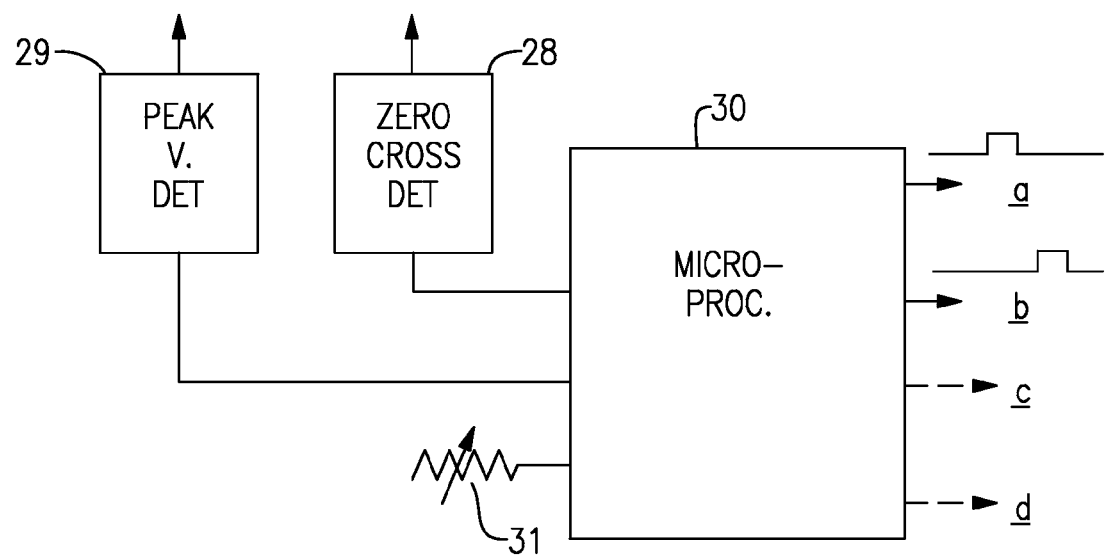
FIG. 9 is a block circuit diagram of a control signal generator circuit component, as may be employed in the embodiments of the present invention.

An example of a control circuit for embodiments of this invention is shown generally in FIG. 9. A zero crossing detector 28 senses the timing of zero voltage (or zero current) and the polarity, and a peak voltage detector senses the peak or maximum voltage of the line AC. Each of these provides an output signal to a microprocessor circuit 30, which is suitably programmed to provide the command signals a and b, and for some embodiments the command signals c and d as well. A user interface control is represented here as a variable resistance 31, but could instead be a digital input, which could be provided e.g. from a computer device, hand held digital device or user interface.

The motor drive circuit of this invention can be adapted to drive devices with significant inductive loads, such as air conditioning compressors.

Figure 10:
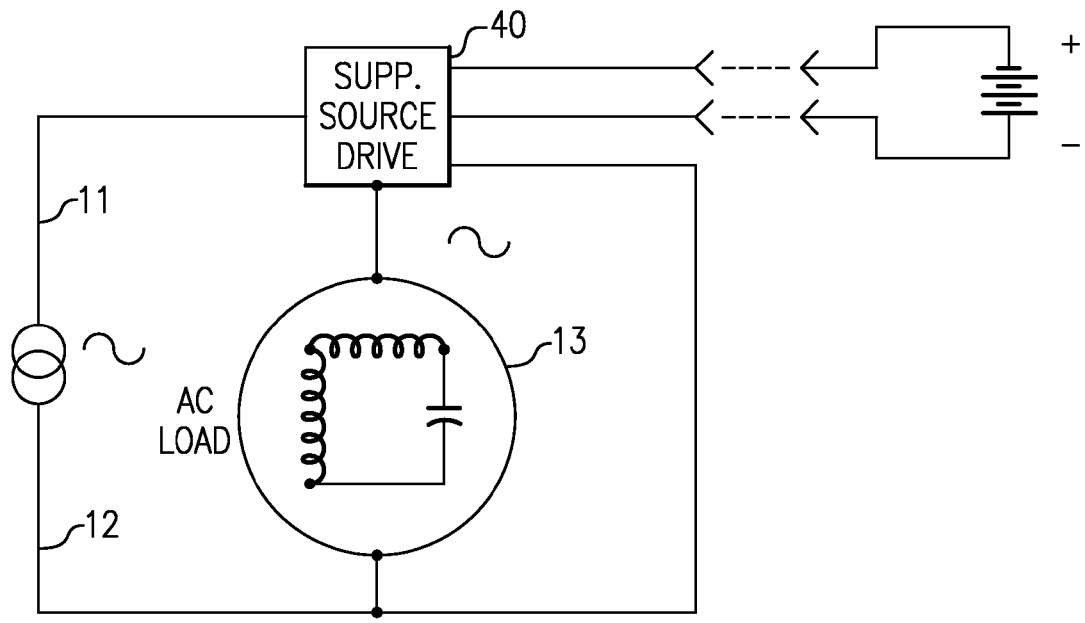
FIG. 10 is a simplified diagram of another embodiment.

FIG. 10 represents a simplified expression of the concept of the FIG. 7 embodiment, for example, in which a voltage control and conditioner circuit arrangement 40 is interposed between a source of AC line power 11, 12 and an AC load 13 (e.g., an induction motor), and in which a supplementary DC battery power source 23 (24) such as solar array(s), can be connected to DC input or output terminals of the arrangement. The arrangement 40 can include capacitive and switched elements as shown and described, e.g., in FIG. 7.

Figure 11:
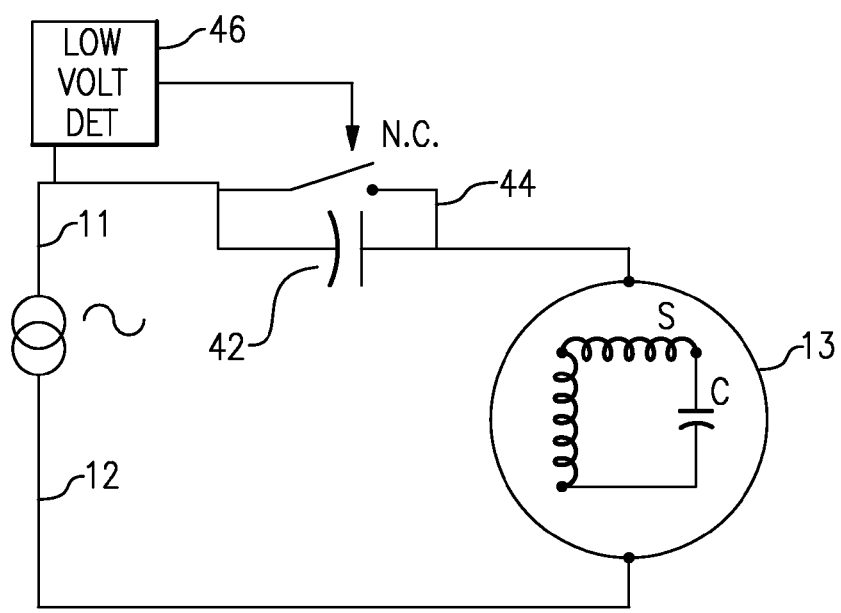
FIG. 11 illustrates yet another embodiment.

Applicants have also discovered that brownout compensation can be achieved with a simple arrangement as shown schematically in FIG. 11. Here, a moderate value AC capacitor 42 can be placed in series in one of the power conductors 11, i.e., interposed between the source of AC line voltage and the AC load 13 (i.e., an induction motor). In this case, the capacitor is positioned in series with the entire load, i.e., both the run winding R and the start winding S and start capacitor C, so as to affect the power wave applied to each. If the line voltage should drop from a nominal 220 volts to a brown-out level of 170 volts RMS, and if a moderate-value AC capacitor, e.g, 40 µf, is used for the capacitor 42, then after the first few cycles the effective power applied to the motor 13 will be between about 205 and 240 volts. This will allow the motor to start and run normally. In this arrangement, some of the power that would normally be reflected back from the motor windings, i.e., (usually expressed as the imaginary component of the complex applied power) is actually stored on the AC capacitor 42, and then is added to the real component of power on the subsequent wave. A normally closed shunt or switch 44 bypasses the power around the capacitor 42 as long as the mains AC power is at or above a threshold level, i.e., a normal minimum line voltage level such as 195 volts. A low voltage detector 46 is connected to line power conductors 11, 12 to open the switch 44 when the line voltage drops below the threshold level. This arrangement is useful for appliances, such as refrigerators and window air conditioners, which may otherwise become unable to start if the line power quality drops due to heavy use, or due to inability of the electrical power provider to deliver power at proper voltage.

Figure 12:
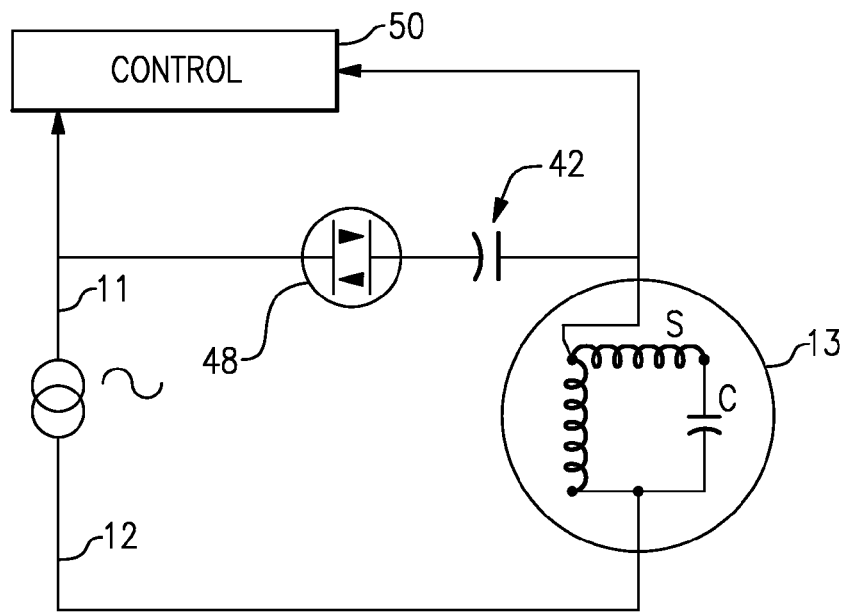
FIG. 12 illustrates an alternative embodiment.
Figure 12A:
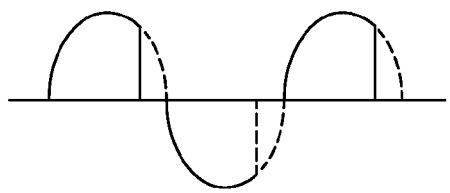
FIG. 12A is a wave diagram for explaining the operation of the FIG. 12 embodiment.

An alternative embodiment of the arrangement of FIG. 12 can be configured generally as shown in FIG. 12. In this case, an electronic switch, e.g., a triac 48, is positioned in series in the power line 11 with the capacitor 42 and load 13. A control circuit 50, with inputs connected with the input line voltage and the applied load voltage, generates a gating signal that is applied to the electronic switch 48, based on the phase and level of the AC voltage. When the line voltage is below a minimum acceptable level, e.g., 195 volts, the switch is gated full on, so that the full power wave is boosted, as discussed in connection with the previous embodiment. On the other hand for line voltage above that threshold, or within the normal range, the control circuit 50 will turn off the electronic switch 48 for some portion of the cycle, producing an applied voltage power wave as illustrated in FIG. 12A, so that the RMS applied voltage stays within a normal range centered on about 220 volts.

Figure 13:
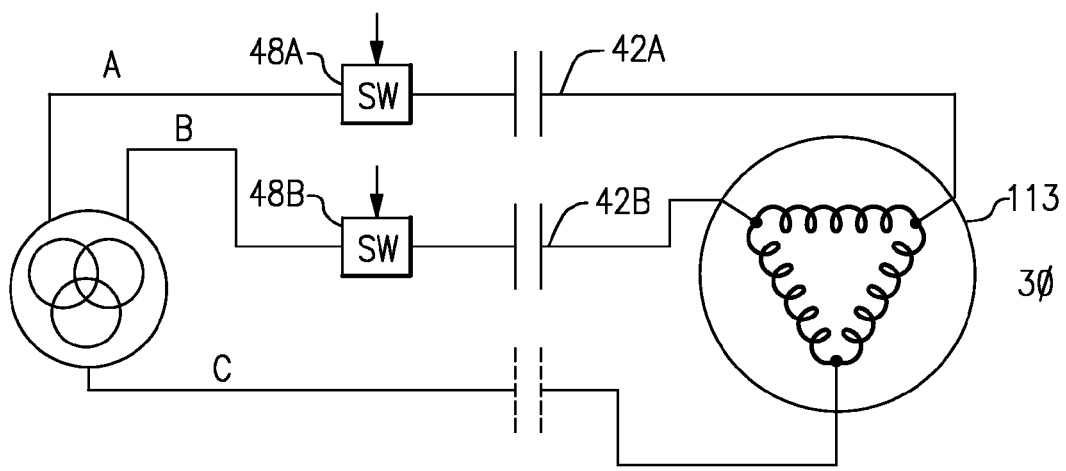
FIG. 13 illustrates a polyphase embodiment.

FIG. 13 illustrates an application of this same arrangement in a polyphase, i.e., three-phase motor application. Here, the line power is in the form of three phased components A, B, and C, and is applied to a motor winding 113, here in a delta configuration. Two of the three power conductors have a capacitor 42A or 42B and electronic switch 48A or 48B in line with their connection to the motor winding. In a delta configuration, there is no need for a similar capacitor on the third or C-phase power conductor, although a switch and capacitor optionally could be installed on that conductor. In a wye configuration, a capacitor and electronic switch would be present on three legs. A control circuit (not shown here) would be similar in function to that element in the FIG. 12 embodiment.

In some possible variations of the circuits shown in FIGS. 11 to 13, DC capacitors could be substituted for the AC capacitor 40. In that case, there would be a set of one DC capacitor and one diode conducting in one direction, and another set of a DC capacitor and diode conducting in the opposite direction, that is, in anti-parallel with the first set.

Figure 14:
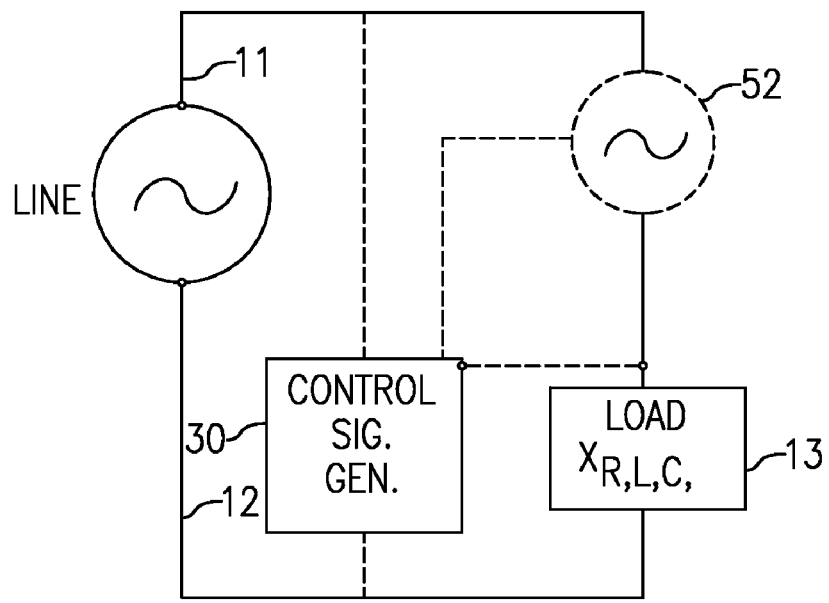
FIGS. 14 and 15 are schematic diagrams for explaining the concept of this invention.
Figure 15:
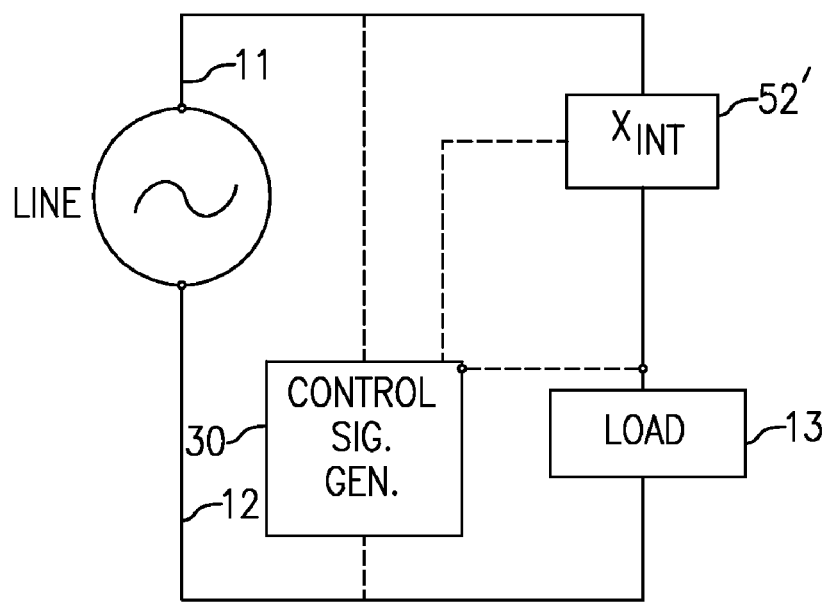

Any of various equivalent circuits may be achieved by carrying out the basic principles of the invention, which can be explained with reference to FIGS. 14 and 15. FIG. 14 is a general schematic showing leads 11 and 12 connecting an AC source of AC line voltage to a complex reactive load 13, such as an induction motor, which has resistive, inductive, and capacitive components, and which will reflect at least some of the incoming AC power that is applied to it. The basic improvement concept here is to employ an intervening synthetic AC wave source 52 in line between the line source and the load 13, which will generate supplemental AC voltage that adds to the line waveform to optimize the phase and voltage level. A control signal generator, e.g., the microprocessor 30 of FIG. 9, is coupled to the line conductors 11, 12 and to the load 13, and provides command signals to control the intervening AC source 52. In the above-described embodiments, the intervening synthetic AC source is implemented as a reactive element 52', as shown in FIG. 15, which is switched in and out in accordance with command signals from the control signal generator 30. The disclosure of those preferred embodiments does not foreclose other possibilities in the implementation of the intervening synthetic AC source.

While the invention has been described in detail with reference to certain preferred embodiments, it should be understood that the invention is not limited to those precise embodiments. Rather, many modifications and variations would present themselves to persons skilled in the art without departure from the scope and spirit of the invention, as defined in the appended claims.

We claim:

1. An in-line voltage regulation circuit capable of responding to changes in quality of an AC input line power to apply an adjusted AC voltage level to an AC load device, the AC load device having first and second AC terminals; the voltage regulation circuit comprising:
    means for connecting to a source of said single-phase AC line power, having a first AC power conductor and a second AC power conductor;
    a two-input line voltage regulator having first and second AC power terminals, the first AC power terminal being connected to the first AC power conductor, the second AC power terminal being connected to the first AC power terminal of said load, and the second AC terminal of the load being connected to the second AC power conductor;
    a control signal generator including sensor inputs coupled to said AC power, and
    means to detect AC voltage level of said AC input line power, means to detect zero crossings of said AC line power, and first and second outputs providing first and second control signals to said line voltage regulator.

2. An in-line voltage regulation circuit according to claim 1, wherein said two-input line voltage regulator includes:
    first and second power capacitors, each having a first electrode and a second electrode, with the first electrode of the first power capacitor and the second electrode of the second power capacitor each being connected to the first AC power terminal of the voltage regulator;
    first and second electronic switching devices, each having a first power electrode, a second power electrode, and a gate, with the first power electrode of the first switching device and the second power electrode of the second switching device each being connected to the second AC power terminal of the voltage regulator;
    with the second electrode of the first power capacitor being connected to the second power electrode of the first switching device and with the first electrode of the second power capacitor being connected to the first power electrode of the second switching device; and
    means coupling the first and second outputs of the control signal generator to the gates of the first and second electronic switching devices, respectively.

3. An in-line voltage regulation circuit according to claim 2, including first and second diodes connected in parallel with said first and second electronic switching devices.

4. An in-line voltage regulation circuit according to claim 3, wherein each of said first and second diodes has an anode connected with the first power electrode of the associated switching device and a cathode connected with the second power electrode of the associated switching device.

5. An in-line voltage regulation circuit according to claim 3, further comprising a third diode connected between said second AC power conductor and the second electrode of said first power capacitor, and a fourth diode connected between said second AC power conductor and the first electrode of said second power capacitor.

6. An in-line voltage regulation circuit according to claim 1, wherein said control signal generator is operative to provide said first and second control signals in a normal mode, in which the first and second control signals are alternately ON for phase angles of 0 to $\pi$ and from $\pi$ to $2\pi$; and in a voltage boost mode where said first and second control signals have an OFF phase imposed for a phase width between $\pi/2$ and $\pi$ and a phase delay between $\pi$ and $3\pi/2$, respectively.

7. An in-line voltage regulation circuit according to claim 6, wherein said control signal generator is operative to provide said first and second control signals in a voltage reduction mode in which said first and second control signals are ON commencing with a phase delay between about $\pi/2$ and it and between about $3\pi/2$ and $2\pi$, respectively.

8. A power and voltage regulation circuit adapted to respond to changes in quality of a phase of AC input line power and create an adjusted AC power wave to be applied to an AC load or to boost the voltage of said AC input line power, including a source of DC power having a positive DC power output and a negative DC power output; and the load having first and second AC load terminals; the power and voltage regulation circuit comprising:

means for connecting to the AC line power, having a first AC power conductor and a second AC power conductor;

a regulator stage having first and second power capacitors each having a first electrode connected to the first AC power conductor and a second electrode, an electronic switch array having a power input connected to the second AC power conductor, power electrodes coupled respectively to the second electrodes of said first and second power capacitors, and output terminals connected to said first and second AC load terminals, respectively;

positive and negative DC conductors connected to the positive and negative power outputs of said source of DC power; and means connected to said positive and negative DC conductors and to the second electrodes of said first and second power capacitors, respectively, for charging said power capacitors, respectively, when the voltage of the input line power is below a predetermined voltage level.

9. The power and voltage regulation circuit of claim 8 wherein said source of DC power includes a neutral power terminal with a voltage between the voltages at said positive and negative power outputs, and further including means connecting said neutral power terminal to the first electrodes of said first and second power capacitors.

10. A voltage regulation circuit capable of responding to changes in quality of a single-phase AC input line power to apply an adjusted AC voltage level to an AC load device, the AC load device having first and second AC terminals; the voltage regulation circuit comprising:

means for connecting to a source of said single-phase AC line power, having a first AC power conductor and a second AC power conductor;

a line voltage regulator having first and second AC power terminals, the first AC power terminal being connected to the first AC power conductor, the second AC power terminal being connected to the first AC power terminal of said load, and the second AC terminal of the load being connected to the second AC power conductor; and a control signal generator including sensor inputs coupled to said AC power source, means to detect AC voltage level of said AC input line power, means to detect zero crossings of said AC line power, and first and second outputs providing first and second control signals to said line voltage regulator;

wherein said voltage regulator includes:

first and second power capacitors, each having a first electrode and a second electrode, with the first electrode of the first power capacitor and the second electrode of the second power capacitor each being connected to the first AC power terminal of the voltage regulator;

first and second electronic switching devices, each having a first power electrode, a second power electrode, and a gate, with the first power electrode of the first switching device and the second power electrode of the second switching device each being connected to the second AC power terminal of the voltage regulator;

third and fourth electronic switching devices, each having a first power electrode, a second power electrode, and a gate, with the first power electrode of the third switching device and the second power electrode of the second switching device each being connected to the second AC power conductor;

with the second electrode of the first power capacitor being connected to the second power electrodes of the first switching device and the third switching device; and with the first electrode of the second power capacitor being connected to the first power electrodes of the second switching device and the fourth switching device; and means coupling the first and second outputs of the control signal generator to the gates of the first and fourth electronic switching devices and to the second and third electronic switching devices, respectively.

11. A voltage regulation circuit according to claim 10 including first and second diodes connected in parallel with said first and said second electronic switching devices, and diodes connected in parallel with said third and fourth electronic switching devices, respectively.

12. A power regulation circuit capable of combining AC line power and a source of DC power to create an adjusted AC power wave to be applied to an AC load, the AC load having first and second AC terminals; the power regulation circuit comprising:

means for connecting to a source of AC line power including a first AC power conductor and a second AC power conductor;

a regulator circuit having first and second AC power terminals connected to the first and second AC power conductors, respectively; said regulation circuit including:

first and second power capacitors each having a first electrode coupled to said first AC power terminal and a second electrode;

a switched bridge including first, second, third and fourth electronic switching devices, the first and second switching devices each having a first power electrode connected to the second AC power terminal and a second power electrode, and the third and fourth electronic switching devices each having a first power electrode connected to the second electrode of a respective one of said first and second power capacitors; the second power electrode of the first and third electronic switching devices being joined to the first AC terminal of said load, and the second power electrodes of the second and fourth electronic switching devices being joined to the second AC terminal of said load;

said source of DC power including a positive DC output and a negative DC output;

said regulation circuit further comprising a fifth electronic switching device interposed between said positive DC output and the second electrode of the first power capacitor and a sixth electronic switching device interposed between said negative DC output and the second electrode of the second power capacitor; and a control signal generator including at least one sensor input coupled to said source of AC line power, and having command signal outputs coupled to gating terminals of said first, second, third and fourth switching devices.

13. The power regulation circuit of claim 12 wherein said DC power source includes a neutral DC output coupled to the first electrodes of said first and second power capacitors.

14. The power regulation circuit of claim 12 wherein said control signal generator has command signal outputs coupled to gating terminals of said fifth and sixth electronic switching devices.

15. The power regulation circuit of claim 12 comprising means for superimposing positive half cycles of said AC line power onto said positive DC output from said source of DC power, and superimposing negative half cycles of said AC line power onto said negative DC output from said source of DC power.

16. A voltage regulation circuit capable of responding to changes in quality of a single-phase AC input line power to apply an adjusted AC voltage level to an AC load, the AC load having first and second AC terminals; the voltage regulation circuit comprising:
  means for connecting to a source of said single-phase AC line power, having a first AC power conductor and a second AC power conductor;
  a line voltage regulator having first and second AC power terminals, the first AC power terminal being connected to the first AC power conductor, the second AC power terminal being connected to the first AC power terminal of said load, and the second AC terminal of the load being connected to the second AC power conductor;
  first and second input DC power sources; and
  a control signal generator including sensor inputs coupled to said AC power source, means to detect AC voltage level of said AC input line power, means to detect zero crossings of said AC line power, and first and second outputs providing first and second control signals to said line voltage regulator;
  wherein said voltage regulator includes:
  first and second power capacitors, each having a first electrode and a second electrode, with the first electrode of the first power capacitor and the second electrode of the second power capacitor each being connected to the first AC power terminal of the voltage regulator;
  first and second electronic switching devices, each having a first power electrode, a second power electrode, and a gate, with the first power electrode of the first switching device and the second power electrode of the second switching device each being connected to the second AC power terminal of the voltage regulator;
  third and fourth electronic switching devices, each having a first power electrode, a second power electrode, and a gate, with the first power electrode of the third switching device and the second power electrode of the second switching device each being connected to the second AC power conductor;
  with the second electrode of the first power capacitor being connected to the second power electrodes of the first switching device and the third switching device; and with the first electrode of the second power capacitor being connected to the first power electrodes of the second switching device and the fourth switching device;
  said first and second DC power sources each having a first power terminal and a second power terminal; with the first power terminal of the first DC power source and the second power terminal of the second DC power source being connected with said first AC power terminal; and with fifth and sixth electronic switches each having a pair of power terminals and a gate, and with the power terminals of the fifth electronic switch connecting the first power capacitor to said first DC power source, and the sixth electronic switch connecting the second power capacitor to said second DC power source;
  means coupling the first and second outputs of the control signal generator to the gates of the first and fourth electronic switching devices and to the second and third electronic switching devices, respectively; and
  means coupling timing outputs of the control signal generator to the gates of the fifth and sixth switching devices.

17. The voltage regulation circuit of claim 16 wherein each of said first and second DC input power sources includes an solar array.

18. The voltage regulation circuit of claim 16 wherein each of said first and second DC input power sources includes a device extracting electrical power from the natural environment.

19. A power and voltage regulation circuit adapted to respond to changes in quality of a phase of AC input line power and create an adjusted AC power wave to be applied to an AC load or to boost the voltage of said AC input line power, including a source of DC power having a positive DC power output and a negative DC power output; and the load having first and second AC load terminals; the power and voltage regulation circuit comprising:
  means for connecting to the AC line power, having a first AC power conductor and a second AC power conductor;
  a regulator stage having first and second power capacitors each having a first electrode connected to the first AC power conductor and a second electrode, an electronic switch array having a power input connected to the second AC power conductor, power electrodes coupled respectively to the second electrodes of said first and second power capacitors, and output terminals connected to said first and second AC load terminals, respectively;
  positive and negative DC conductors connected to the positive and negative power outputs of said source of DC power; and
  means connected to said positive and negative DC conductors and to the second electrodes of said first and second power capacitors, respectively, for adding supplemental energy to said AC load, when the voltage of the input line power is below a predetermined voltage level.

20. A power and voltage regulation circuit adapted to respond to changes in quality of a phase of AC input line power and create an adjusted AC power wave to be applied to a complex reactive AC load which has resistive, inductive, and capacitive elements, and the load having AC load terminals, such that the AC load reflects at least some of the incoming AC power that is applied to said load terminals, the power and voltage regulation circuit comprising:
  means for connecting to the AC line power, having a first AC power conductor and a second AC power conductor;
  a source of a synthetic AC power wave interposed in series with the complex AC load such that the source is interposed between one of said first and second AC power conductors and a corresponding one of the AC load terminals, said source of synthetic AC power including means for absorbing at least some of the AC power that is reflected from the complex AC load, and generating a supplemental voltage wave that is added to the AC input line power to optimize the phase and voltage level of the AC power applied to said complex AC source.

21. A power and voltage regulation circuit according to claim 20, wherein said source of a synthetic AC power wave includes a reactive element interposed between said one of the first and second AC power conductors and said corresponding one of said AC load terminal.

22. A power and voltage regulation circuit according to claim 21, wherein said reactive element is formed as an AC capacitor.

23. A power and voltage regulation circuit according to claim 20, comprising a control signal generator having inputs connected to said AC power conductors and to said AC load terminals, and one or more outputs coupled to said source of synthetic AC power wave; and wherein said source of synthetic AC power wave comprises a reactive element and switching means controlled by said control signal generator for controllably switching said reactive element in and out of circuit with said AC load.

* * * * *

UNITED STATES PATENT AND TRADEMARK OFFICE
CERTIFICATE OF CORRECTION

| | | |
|---|---|---|
| PATENT NO. | : 8,093,858 B1 | |
| APPLICATION NO. | : 13/037807 | |
| DATED | : January 10, 2012 | |
| INVENTOR(S) | : Hassan B. Kadah et al. | |

It is certified that error appears in the above-identified patent and that said Letters Patent is hereby corrected as shown below:

Col. 10, line 39:   "A" should read --Δ--

Signed and Sealed this
Sixth Day of March, 2012

David J. Kappos
*Director of the United States Patent and Trademark Office*